(12) United States Patent
Berlanger et al.

(10) Patent No.: US 8,505,202 B2
(45) Date of Patent: *Aug. 13, 2013

(54) PROCESS FOR MANUFACTURING A SINGLE-PIECE BLISK WITH A TEMPORARY BLADE SUPPORT RING ARRANGED AT A DISTANCE FROM BLADE TIPS

(75) Inventors: Serge Berlanger, Leuville sur Orge (FR); Sebastien Bordu, Brie Comte Robert (FR); Thierry Jean Maleville, Milly la Foret (FR); Christophe Charles Maurice Roca, Soisy sur Seine (FR)

(73) Assignee: Snecma, Paris (FR)

( * ) Notice: Subject to any disclaimer, the term of this patent is extended or adjusted under 35 U.S.C. 154(b) by 332 days.

This patent is subject to a terminal disclaimer.

(21) Appl. No.: 12/933,884

(22) PCT Filed: Mar. 25, 2009

(86) PCT No.: PCT/EP2009/053484
§ 371 (c)(1),
(2), (4) Date: Sep. 22, 2010

(87) PCT Pub. No.: WO2009/121766
PCT Pub. Date: Oct. 8, 2009

(65) Prior Publication Data
US 2011/0016714 A1    Jan. 27, 2011

(30) Foreign Application Priority Data

Mar. 31, 2008 (FR) ..................... 08 52080

(51) Int. Cl.
*B23P 15/04* (2006.01)
*B24C 1/00* (2006.01)

(52) U.S. Cl.
USPC ........ 29/889.23; 29/418; 29/899.2; 29/889.7; 451/38; 451/40

(58) Field of Classification Search
USPC .................. 29/889.7, 889.23; 451/38, 40, 99
See application file for complete search history.

(56) References Cited

U.S. PATENT DOCUMENTS 2,480,807 A * 8/1949 De Vlieg .................. 409/84
2,633,776 A * 4/1953 Schenk .................. 409/132
(Continued)

FOREIGN PATENT DOCUMENTS
EP    1 285 714    2/2003
EP    1 433 557    6/2004
(Continued)

OTHER PUBLICATIONS

Zhao Wan-Sheng, et al., "Machining Technology Used in Turbine Blisk", Aviation Precision Manufacturing Technology, vol. 36 No. 5, Oct. 2000, pp. 1-5 (With English Abstract).

*Primary Examiner* — Alexander P Taousakis
(74) *Attorney, Agent, or Firm* — Oblon, Spivak, McClelland, Maier & Neustadt, L.L.P.

(57) ABSTRACT

A process for manufacturing a single-piece blisk, including: using an abrasive water jet to cut a block of material, so as to create blade preforms extending radially outwards from a disk, while keeping material to form a connecting mechanism between directly consecutive blade preforms, the cutting being done such that the connecting mechanism approximately forms a ring at a radial spacing from the disk, connecting the blade preforms together at a radially inwards distance from their tips, and then removing the connecting mechanism.

14 Claims, 4 Drawing Sheets

(56) References Cited

U.S. PATENT DOCUMENTS

| | | | | |
|---|---|---|---|---|
| 2,962,941 A | * | 12/1960 | Stein et al. | 409/122 |
| 5,822,841 A | | 10/1998 | Bales et al. | |
| 5,867,885 A | | 2/1999 | Bales et al. | |
| 6,077,002 A | * | 6/2000 | Lowe | 409/132 |
| 6,276,899 B1 | | 8/2001 | Lambert et al. | |
| 7,831,332 B2 | * | 11/2010 | Diehl | 700/190 |
| 7,967,659 B2 | * | 6/2011 | Erickson et al. | 451/5 |
| 2003/0039547 A1 | | 2/2003 | Bourgy et al. | |
| 2004/0124181 A1 | | 7/2004 | Wei et al. | |
| 2005/0025598 A1 | | 2/2005 | Nowak et al. | |

FOREIGN PATENT DOCUMENTS

| | | |
|---|---|---|
| EP | 1 502 682 | 2/2005 |
| FR | 2 699 850 | 7/1994 |
| WO | 2007 082504 | 7/2007 |

* cited by examiner

PROCESS FOR MANUFACTURING A SINGLE-PIECE BLISK WITH A TEMPORARY BLADE SUPPORT RING ARRANGED AT A DISTANCE FROM BLADE TIPS

TECHNICAL DOMAIN

This invention relates in general to the manufacturing of single-piece blisks, preferably for an aircraft turbine engine.

STATE OF PRIOR ART

A single-piece bladed disk, also called a blisk, can be made using an abrasive water jet to cut a material block followed by one or more milling steps.

The use of a cutting step using an abrasive water jet prior to milling can considerably reduce the manufacturing times and costs in comparison with a process based solely on milling. This is particularly due to the fact that such a manufacturing process requires removal of about 75% of the material in the original block to make the blisk. The removal of a large part of this material by cutting with an abrasive jet can reduce production times and also limits wear of milling machines.

Nevertheless, this process cannot be considered to be fully optimised. The presence of deformations and vibrations of the blades during this process is a disadvantage, that becomes particularly severe for long blades. Low advance rates are necessary to limit the consequences of these deformations and vibrations on the quality of the blisk produced, thus slowing production. Vibrations and longer manufacturing times also increase tool wear that has a negative impact on production costs.

SUMMARY OF THE INVENTION

Therefore, the purpose of the invention is to at least partly remedy the above-mentioned disadvantages of embodiments according to prior art.

To achieve this, the purpose of the invention is a process for manufacturing a single-piece blisk, comprising:
- a step in which an abrasive water jet is used to cut a block of material so as to create blade preforms extending radially outwards from a disk while keeping material to form the connecting means between directly consecutive blade preforms, the cutting step being done such that said connecting means approximately form a ring at a radial spacing from said disk, and connecting said blade preforms together at a radially inwards distance from their tips; then
- a step to remove said connecting means.

The invention is thus remarkable in that during the cutting step using an abrasive water jet, it creates a support ring between blade preforms. This can strongly limit or even eradicate deformations and vibrations of blades while they are being manufactured, since they remain fixed to each other mechanically by material in the initial block.

This specific feature means that the different tools can be used at high advance rates thus reducing production times, without jeopardising the quality of the finished blisk. Furthermore, the reduction of production times and the reduction of blade vibrations during manufacturing slow tool wear, which advantageously limits production costs.

Therefore the abrasive jet cutting step is done such that said connecting means approximately form a ring, preferably centred on the disk axis and at a distance from the tips of the blade preforms. This ring preferably extends around 360° and is interrupted only by the blade preforms that it connects together. However as mentioned above, this ring is not necessarily completely closed, in other words it may not connect all directly consecutive preforms.

However, the cutting step using an abrasive water jet is preferably made such that said ring connects all blade preforms to each other, and each preform will subsequently form one blade of the blisk. The ring then connects said blade preforms together at a radially inwards distance from their tips. For example in this case, it would be possible for the ring to connect the preforms to each other at approximately mid-length.

Note that a peripheral support ring can be provided together with an inner support ring as described above, the inner support ring being radially inwards from the peripheral ring.

The material forming the connecting means is preferably kept until the end of the abrasive water jet cutting step. It is then removed only during a later step in the blisk manufacturing process.

Note in this respect that the abrasive water jet cutting step is followed by a step to mill blade preforms, the milling step preferably being done so as to obtain profiled blade blanks, this step preferably being followed by a milling step to finish blade blanks so as to obtain blades to the final profile.

According to a first preferred embodiment of this invention, said step to remove said connecting means is done before said step to mill blade preforms, and therefore preferably between this latter step and the abrasive water jet cutting step.

According to a second preferred embodiment of this invention, said step to remove said connecting means is done between said step to mill blade preforms and said finishing step.

More generally, it is possible that the step to remove said connecting means can be done after said step to mill blade preforms, and it can be followed by a separate milling finishing step or it may include such a finishing step.

In this respect, according to a third preferred embodiment of this invention, said step to remove said connecting means is done after said finishing step.

Obviously, other conventional steps can be used in the process according to the invention, such as:
- turning of the material block before the cutting step using an abrasive water jet;
- polishing and/or shot blasting of the blades after the finishing step;
- cutting blades to length;
- and balancing of the blisk.

Preferably, the diameter of said single-piece blisk is greater than or equal to 800 mm. In this respect, note that the presence of connecting means holding the blades together during manufacturing makes it possible to manufacture large diameter blisks with long blades since the blade deformations and vibrations are reduced or even eliminated. Preferably, the minimum length of the blades is 150 mm.

Preferably, the thickness of said single-piece blisk is greater than or equal to 100 mm. Nevertheless, it may be of the order of 160 mm or even more due to the potentially high performances that can be achieved by the abrasive water jet cutting technique. This thickness is approximately equal to the distance along the blisk axis covered by each blade, between the leading edge and the trailing edge.

Preferably, the blades of the single-piece blisk are twisted, the angle of twist varying up to 45° or even more.

Preferably, said material block used is made of titanium or a titanium alloy.

Preferably, said single-piece blisk is a single-piece blisk for an aircraft turbine engine.

Even more preferably, said single-piece blisk is a single-piece blisk for a turbine or compressor rotor in an aircraft turbine engine.

Other advantages and characteristics of the invention will become clear after reading the following detailed and non-limitative description.

BRIEF DESCRIPTION OF THE DRAWINGS

This description will be made with reference to the appended drawings among which.

DETAILED DESCRIPTION OF PREFERRED EMBODIMENTS

Figure 1:
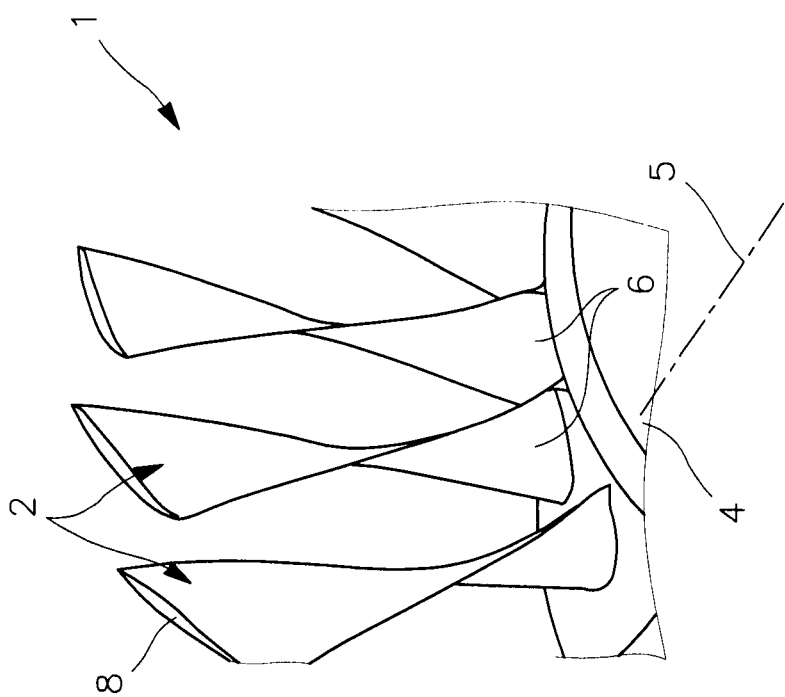
FIG. 1 shows a perspective partial view of a single-piece blisk for a turbine engine that can be obtained by implementing the manufacturing process according to this invention.

Firstly with reference to FIG. 1, the figure shows a single-piece blisk 1 to be obtained by the use of a manufacturing process according to this invention. It is preferably intended to form part of a compressor or turbine rotor for an aircraft turbine engine.

The single-piece blisk, hereinafter referred to as a blisk that is to be obtained using the process according to this invention is large, in other words its diameter is greater than or equal to 800 mm, the length of its blades 2 is not less than 150 mm and the thickness <<e>> of its disk 4 is greater than or equal to 130 mm. Furthermore, the blades supported by the disk 4 with its central axis 5 are strongly twisted with an angle of twist up to or even more than 45°. For information, this angle is equal to the fictitious angle between the root 6 and the tip 8 of a specific blade 2, according to conventional practice.

A preferred embodiment of the process for manufacturing the blisk 1 will now be described with reference to FIGS. 2a to 2e.

Firstly, a first turning step is performed on a block of material made of titanium alloy, also called a <<single-piece blank>> and preferably pre-machined, to machine this block for example to within 1 mm of its final dimensions.

The next step consists of cutting the solid block using an abrasive water jet so as to form the blade preforms.

This is done using a very high pressure (for example 3000 bars) and very high precision water jet cutting machine (for example a 6-axis machine). The very high water pressure transports the abrasive optimising its cutting effect on the material. The water jet is created in a known manner using a diamond or sapphire nozzle. There is also a mixing chamber used to add abrasive such as sand. A focussing gun homogenises the water and sand, focussing sand on the zone to be cut.

This abrasive jet cutting technique enables a large material removal rate and good repeatability. It is thus perfectly suitable for removing material so as to create inter-blade spaces through the entire thickness <<e>> of the material block 100 along its axis 5.

Figures 2A, 2B:
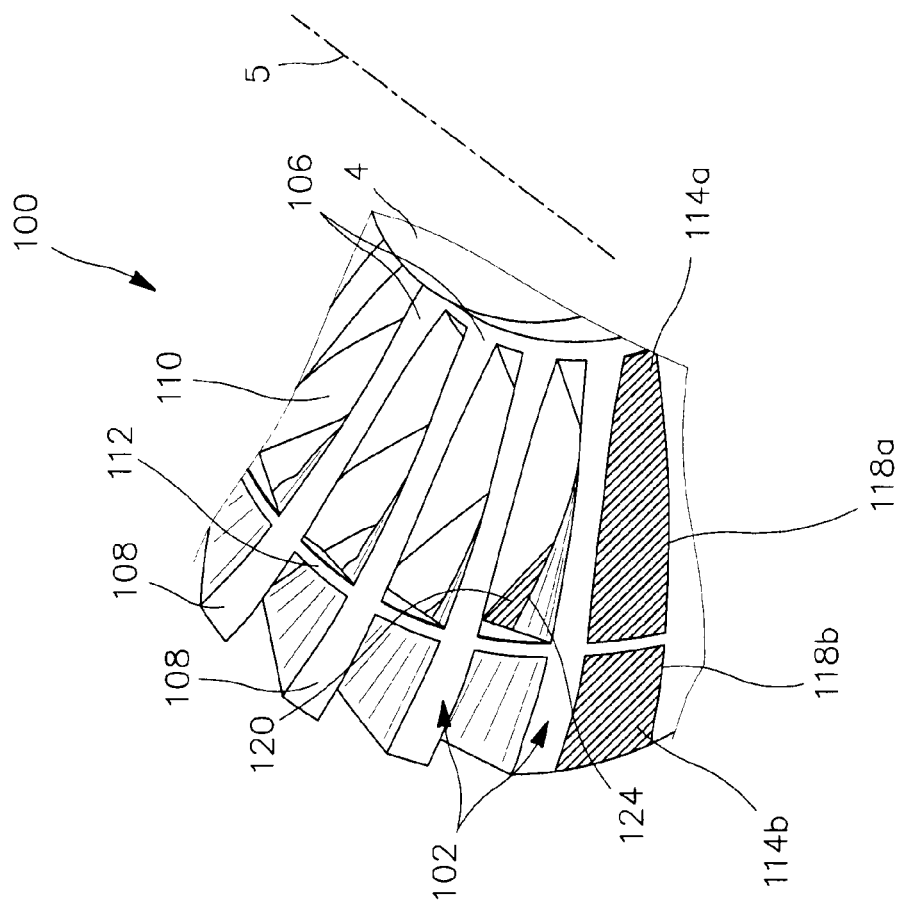
FIGS. 2a to 2e represent views diagrammatically showing the single-piece blisk at different steps in its manufacturing process, when the blisk is made according to one of the preferred embodiments.

This is illustrated in FIG. 2a that shows the top part of the material block 100 after the abrasive water jet cutting step is complete. Therefore, this block contains blade preforms 102 along the radial direction from the disk 4, in other words orthogonal to the central axis 5. In general, the cutout is made within the thickness of the block 100 so as to form inter-blade spaces 110 between blade preforms 102 that are directly consecutive along the circumference.

It is also made so as to form ring-shaped connecting means 112 between the preforms 102, this ring 112 being centred on the axis 5. This ring preferably connects all blade preforms 102 to each other, at a distance from the root 4 of between approximately one half and five sixths of the total length of the preform. Thus, the ring 112 is located radially inwards from the tips 108 of the blade preforms, and consequently creates a residue of material within the inter-blade spaces 110 before it is eliminated during a subsequent step in the process.

This abrasive water jet cutting step can be implemented by making a first cutting operation to remove two first pieces of material each of which twists or has a spiral shape along the radial direction from the disk, these two first pieces being separated from each other along the radial direction by the ring, the first operation then being followed by a second cutting operation to remove a second piece that also twists or has a spiral shape along the radial direction.

More precisely, the left part of the diagrammatic view contained in FIG. 2b shows that the first cutting operation will cut out a first piece of material 114a extending through the entire thickness of the block 100 along its axis 5. This is done by moving the axis of the focussing gun 116 along a closed line 118a shown in the lower part of FIG. 2a, initiated from the root 4 and extending along the radial direction as far as the theoretical position of the ring 112, the line 118a then following this ring in the circumferential direction before changing to the radially inwards direction again to reach the root 4, and then following this root back to its initial point.

During its path along the above-mentioned line 118a, the axis of the gun 116 moves by an appropriate additional movement relative to the axis 5 that preferably remains fixed, this additional movement essentially consisting of the axis of the gun pivoting about the radial direction and forming a first piece 114a with a generally twisted shape along the radial direction. More generally, note that the path followed by the gun 116 relative to the axis 5 is a so-called 5-axis path obtained by two simultaneous rotations. The first piece 114a is preferably removed manually by the operator as shown diagrammatically in the central part of FIG. 2b.

As can be seen on this figure that shows a typical section perpendicular to the radial direction, the piece 114a is in the form of a quadrilateral for which the two opposite sides along the thickness of the block pass very close to the two directly consecutive blades 2 that will be obtained once the process is complete.

Then, once again with reference to the left part of FIG. 2b and the bottom part of FIG. 2a, the first cutting operation is continued so as to cut out another first piece of material 114b extending through the entire thickness of the block 100 along the axis 5, and globally located along the outside radial extension of the piece 114a from which it is separated by the portion of the ring 112 located facing these two pieces. This is done by displacing the axis of the focussing gun 116 along a globally U-shaped line 118b, initiated from a radial end of the block 100 and extending radially inwards as far as the theoretical position of the ring 112, the line 118b then following this ring along the circumferential direction before changing to the radially inwards direction again to reach another radial end of the block 100.

During its path along the above-mentioned line 118b, the axis of the gun 116 moves by an appropriate additional movement relative to the axis 5 that preferably remains fixed, this additional movement essentially consisting of the axis of the gun pivoting about the radial direction and forming another first piece 114b with a generally twisted shape along the radial direction. This first piece 114b is also preferably removed manually by the operator as shown diagrammatically in the central part of FIG. 2b. As can be seen on this figure that shows a typical section perpendicular to the radial direction, the piece 114b is also in the form of a quadrilateral for which the two opposite sides along the thickness of the block pass very close to the two directly consecutive blades 2 that will be obtained once the process is complete.

Following on from the above, each removal of a first piece 114a, 114b forms the surface of two directly consecutive blade preforms 102. Preferably, the first step is to cut out all the first pieces 114a, 114b, the number of which depends on the number of blades to be provided in the blisk, and these pieces are then removed manually before starting the second cutting operation.

This second operation is done such that the shape of the resulting blade preforms is as close as possible to the twisted shape with inverted curvature of the final blades which is difficult to approach with a single cut since the abrasive water jet passes through the block in an approximately straight line, although the blade sections are curved.

The right part of the diagrammatic view contained in FIG. 2b shows that the second cutting operation will cut out a second piece of material 120 that extends over only part of the thickness of the block 100, in other words over only part of the thickness of the radial elements 122 formed by removal of the first pieces 114a, 114b. The piece 120 also extends only over a radial portion of its associated element 122, namely it extends from the root without reaching the tip of the preform 108, namely for example only as far as the ring 112 as can be seen in FIG. 2a.

This is done by moving the focussing gun 116 along a radial line 124, a portion of which is shown in FIG. 2a. It is initiated from root 4 and therefore extends approximately radially until it reaches ring 112 formed by removal of the first pieces 114a, 114b. For example, the line 124 through which the abrasive water jet passes is located at about half-thickness of the radial elements 122.

During its path along the above-mentioned line 124, the axis of the gun 116 is driven by an appropriate additional movement relative to the axis 5 that preferably remains fixed, this additional movement essentially involving pivoting of the axis of the gun about the radial direction, and forming a second piece 120 also with a generally twisted shape along the radial direction. Once again, more generally, note that the path followed by the gun 116 relative to the axis 5 is a so-called 5-axis path obtained by two simultaneous rotations. This second piece 120, once completely separated from the root 5 still by abrasive water jet, preferably separates by itself without assistance by the operator, as shown diagrammatically in the right part of FIG. 2b.

In this respect, note that the gun 116 moves not only along the approximately radial line 124, but also along a circular portion (not shown) of a line extending from the inner radial end of the line 124 along the root 4 to completely separate the piece 120 from the root.

As can be seen in FIG. 2b that shows an arbitrary section perpendicular to the radial direction, the piece 120 is in the form of a triangle of which one of the sides passes as close as possible to the blade 2 that will be obtained from the radial element 122 concerned once the process is complete.

Once all the second pieces 120 have been removed, all that remains of the block are the blade preforms 102 connected together by the ring 112 which is then in the form of an annular ring interrupted by each preform 102. The abrasive water jet cutting step is then complete.

Figure 2C:
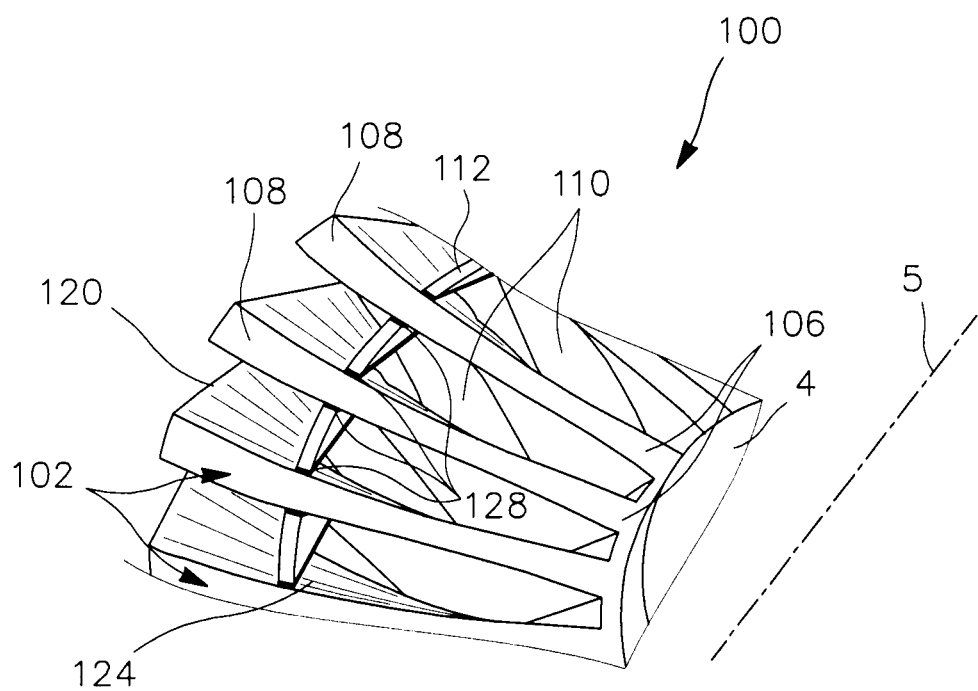
Figure 2E:
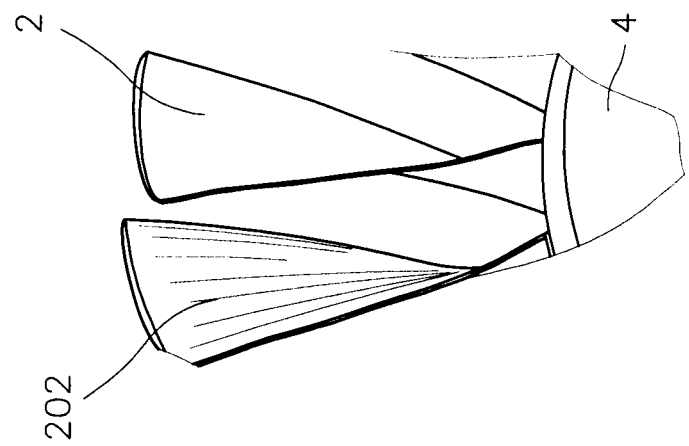

The process then continues with a step in which the ring 112 connecting the preforms 102 is removed. This step is done in any manner that an expert in the subject considers appropriate, such as wire cutting or milling. In this respect, FIG. 2c schematically shows separation of the ring 112 from the rest of the block 100, by breakage of the links between this ring 112 and each of the preforms. Once all these approximately radial breaks have been obtained, the ring can then easily be extracted from the block 100, section by section.

The next step is to mill the blade preforms 102 so as to obtain profiled blade blanks 202. In other words, the purpose of this step, for example done using a 5-axis milling machine, is to remove the material remaining on the blade preforms 102 to approach the final dimensions, for example within 0.6 mm.

Figure 2D:
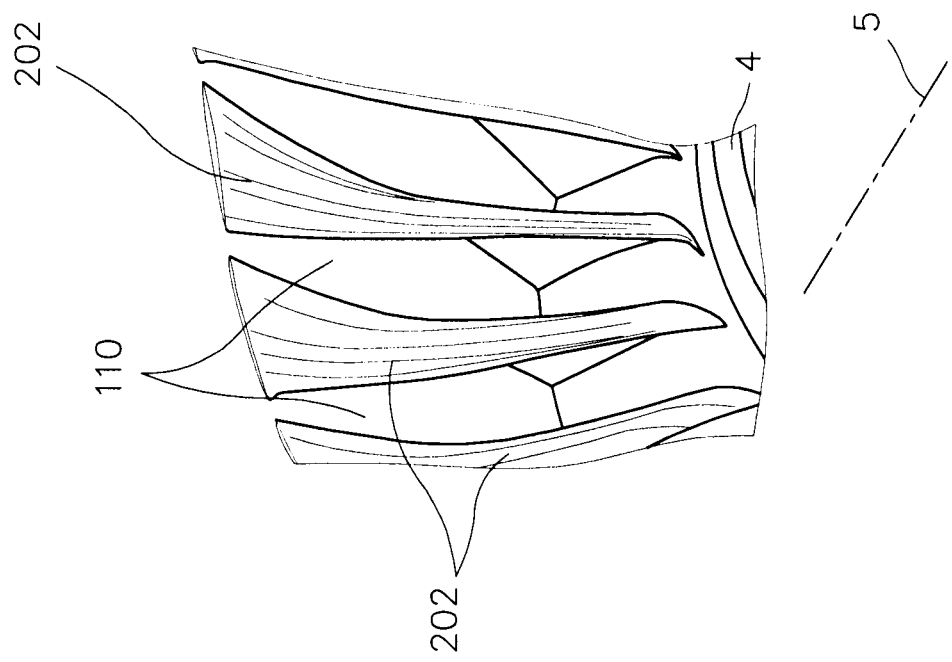

In this case, the preforms 102 are preferably machined one by one and each forms a profiled blade blank 202, as shown in FIG. 2d.

Another milling step is then done and is called the finishing step to mill the blades 2 to achieve their final profile from the blanks 202. The tooling used enables more precise machining to obtain the final dimensions, therefore obtaining blades 2 as shown in the right part of FIG. 2e.

At this stage of the process, the remaining volume of material is less than 25% of the volume of this block just before initiation of the abrasive water jet cutting step, namely just after the above-mentioned turning step.

The process may also be continued by one or several conventional steps including a polishing step for example by manual fitting or tribofinishing, a shot blasting step, a blade cutting to length step and/or a blisk balancing step.

Alternately, the ring can be removed after the blade preform milling step, or after the milling finishing step.

Obviously, an expert in the subject could make various modifications to the invention as described above solely as non-limitative examples.

The invention claimed is:

1. A process for manufacturing a single-piece blisk, comprising:
   cutting a block of material using an abrasive water jet to create blade preforms extending radially outwards from a disk, while keeping material to form a connecting mechanism between directly consecutive blade preforms, the cutting being done such that the connecting mechanism approximately forms a ring at a radial spacing from the disk, and connects the blade preforms together at a radially inwards distance from their tips; and
   removing the connecting mechanism.

2. The process according to claim 1, wherein the cutting using the abrasive water jet is done such that the ring connects all blade preforms to each other.

3. The process according to claim 1, wherein the cutting using the abrasive water jet is followed by milling the blade preforms.

4. The process according to claim 3, wherein the milling the blade preforms is done so as to obtain profiled blade blanks, and further includes a milling to finish the blade blanks, so as to obtain blades to a final profile.

5. The process according to claim 3, wherein the removing the connecting mechanism is done before the milling the blade preforms.

6. The process according to claim 4, wherein the removing the connecting mechanism is done between the milling the blade preforms and the milling to finish the blade blanks.

7. The process according to claim 3, wherein the removing the connecting mechanism is done after the milling the blade preforms.

8. The process according to claim 4, wherein the removing the connecting mechanism is done after the milling to finish the blade blanks.

9. The process according to claim 1, wherein the diameter of the single-piece blisk is greater than or equal to 800 mm.

10. The process according to claim 1, wherein the thickness of the single-piece blisk is greater than or equal to 100 mm.

11. The process according to claim 1, wherein the blades of the single-piece blisk are twisted.

12. The process according to claim 1, wherein the material block used is made of titanium or a titanium alloy.

13. The process according to claim 1, wherein the single-piece blisk is a single-piece blisk for an aircraft turbine engine.

14. The process according to claim 1, wherein the single-piece blisk is a single-piece blisk for a turbine or compressor rotor in an aircraft turbine engine.

* * * * *